(12) United States Patent
Babb et al.

(10) Patent No.: US 12,028,209 B2
(45) Date of Patent: Jul. 2, 2024

(54) INTELLIGENT APPLICATION FOR NETWORK CHANGE MANAGEMENT

(71) Applicant: T-Mobile Innovations LLC, Overland Park, KS (US)

(72) Inventors: Jeremy Adam Babb, Maple Valley, WA (US); Brett Andrew Hadden, Maple Valley, WA (US); Simon Hugh Puttick, Redmond, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 17/559,185

(22) Filed: Dec. 22, 2021

(65) Prior Publication Data
US 2023/0198839 A1    Jun. 22, 2023

(51) Int. Cl.
*H04L 41/0816*    (2022.01)
*H04L 43/0817*    (2022.01)

(52) U.S. Cl.
CPC ...... *H04L 41/0816* (2013.01); *H04L 43/0817* (2013.01)

(58) Field of Classification Search
CPC . H04L 41/0816; H04L 43/0817; H04L 43/02; H04L 41/06
USPC ......................................................... 709/223
See application file for complete search history.

(56) References Cited

U.S. PATENT DOCUMENTS

| | | | | |
|---|---|---|---|---|
| 5,568,399 | A * | 10/1996 | Sumic ................. | G01R 31/086 700/293 |
| 6,502,022 | B1 * | 12/2002 | Chastain ............. | G08G 1/0962 701/36 |
| 11,271,961 | B1 * | 3/2022 | Berger ................. | G06F 9/451 |
| 2016/0295426 | A1 * | 10/2016 | Gormley .............. | H04W 24/02 |
| 2017/0316586 | A1 * | 11/2017 | Ricci .................. | G06F 3/04842 |
| 2020/0267052 | A1 * | 8/2020 | Mahimkar .......... | H04L 41/0883 |
| 2021/0306877 | A1 * | 9/2021 | Blake .................. | H04W 24/04 |

FOREIGN PATENT DOCUMENTS

WO    WO-2017171918 A1 *  10/2017 ............ H04W 28/08

* cited by examiner

*Primary Examiner* — Meng Vang
(74) *Attorney, Agent, or Firm* — Shook, Hardy & Bacon L.L.P.

(57) ABSTRACT

Computerized systems and methods are provided for managing changes being made on a geographically diverse mobile telecommunications network. An intelligent application for network change management collects change requests to be implemented in a geographically disperse mobile telecommunications network. The intelligent application determines whether the changes to be implemented are for devices that high risk from a network impacting event, such as a major event or weather. The application initiates actions to suspend the changes from being implemented to the network until the devices are no longer at high risk from a network impacting event.

10 Claims, 7 Drawing Sheets

INTELLIGENT APPLICATION FOR NETWORK CHANGE MANAGEMENT

FIELD

The present disclosure generally relates to specific applications. In particular, this disclosure relates to applications for managing one or more tasks or operations.

BACKGROUND

Current change management in a geographically disperse mobile network relies on tracking changes in spreadsheets and running reports. This methodology is not robust and does not provide changes in real time. Furthermore, current methodology does not provide control capabilities. For example, the spreadsheets cannot determine, track nor suspend high-risk changes to the network. Current technology is unable to initiate actions on a geographically disperse mobile network. Furthermore, current technology does not allow for a smooth alignment, awareness, coordination nor prioritization of thousands of scheduled changes each day.

BRIEF DESCRIPTION OF THE DRAWINGS

Illustrative embodiments of the present invention are described in detail below with reference to the attached drawing figures, and wherein.

SUMMARY

Figure 1:
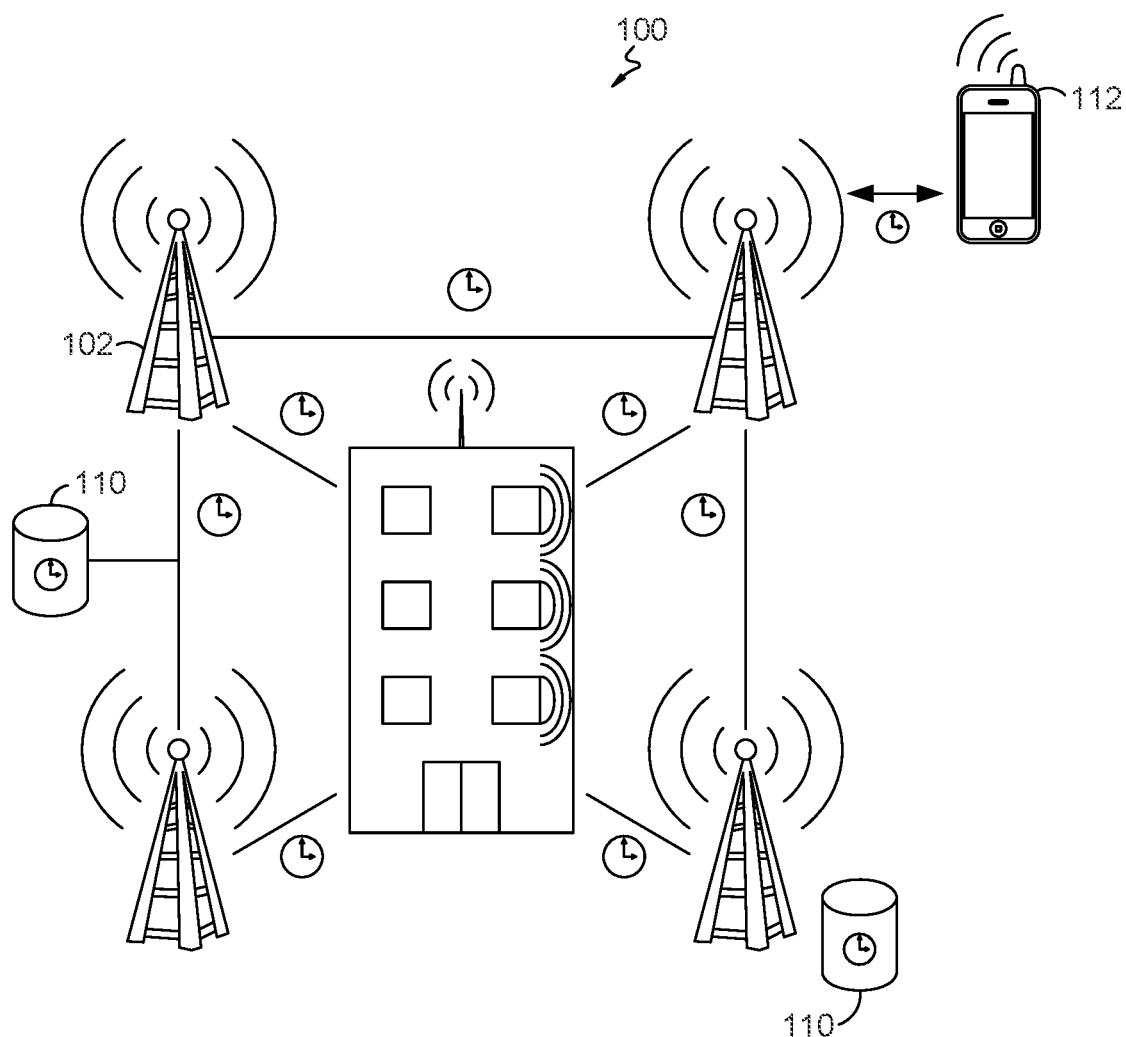
FIG. 1 depicts an exemplary geographically disperse mobile telecommunications network suitable for use in implementing aspects herein.

Computerized systems and methods are provided for managing changes being made on a geographically diverse mobile telecommunications network. An intelligent application for network change management collects change requests to be implemented in a geographically disperse mobile telecommunications network. The intelligent application determines whether the changes to be implement are for devices that high risk from a network impacting event, such as a major event or weather. The application initiates actions to suspend the changes from being implemented to the network until the devices are no longer at high risk from a network impacting event.

In aspects, a computer system, method and computer readable media are provided for collecting one or more change requests for changes to be implemented in a geographically disperse mobile telecommunications network. A first group of devices in the mobile telecommunications network to be changed is determined for the one or more change requests. The first group of devices to be changed is compared to predefined criteria to determine a second group of devices impacted by a network impacting event. The change requests for the second group of devices impacted by a network impacting event are determined to be high risk to the geographically disperse mobile telecommunications network. Responsive to determining the changes to the second group of devices is high risk, an action to suspend changes from being implemented is initiated for the impacted change requests for the second group of devices.

DETAILED DESCRIPTION

The subject matter of the present invention is being described with specificity herein to meet statutory requirements. However, the description itself is not intended to limit the scope of this patent. Rather, the inventors have contemplated that the claimed subject matter might also be embodied in other ways, to include different operators or combinations of operators similar to the ones described in this document, in conjunction with other present or future technologies. Terms should not be interpreted as implying any particular order among or between various operators herein disclosed unless and except when the order of individual operators is explicitly described. As such, although the terms "operator" and/or "block" can be used herein to connote different elements of system and/or methods, the terms should not be interpreted as implying any particular order and/or dependencies among or between various components and/or operators herein disclosed unless and except when the order of individual operators is explicitly described. The present disclosure will now be described more fully herein with reference to the accompanying drawings, which may not be drawn to scale and which are not to be construed as limiting. Indeed, the present invention can be embodied in many different forms and should not be construed as limited to the aspects set forth herein. Further, it will be apparent from this Detailed Description the technological solutions disclosed herein are only a portion of those provided by the present invention. As such, the technological problems, solutions, advances, and improvements expressly referenced and explained herein should not be construed in a way that would limit the benefits, improvements, and/or practical application of the discussed aspects of the present invention.

As one skilled in the art will appreciate, embodiments of the invention may be embodied as, among other things: a method, system, or set of instructions embodied on one or more computer readable media. Accordingly, the embodiments may take the form of a hardware embodiment, a software embodiment, or an embodiment combining software and hardware. In one embodiment, the invention takes the form of a computer-program product that includes computer-usable instructions embodied on one or more computer-readable media, as discussed further with respect to FIG. 2.

Embodiments herein provide a technological solution that addresses, solves, and overcomes the technological problems and/or shortcomings found in systems for making changes and initiating change actions in a geographically diverse mobile telecommunications network. A large mobile telecommunications network can receive thousands of change requests per day and make thousands of changes to its IT systems, cell sites, switch locations, and data centers each day. Current systems for managing these changes include Excel spreadsheets and reporting. Excel spreadsheets and stale reports do not provide change deployment visibility and planning for nightly changes. Furthermore, Excel spreadsheets and reporting do not provide real-time monitoring of changes being made nor the ability to optimize capacity and prioritizes changes to the network. In addition, the Excel spreadsheets and reports are not easily accessible to users, such as technical engineers making changes, market managers, and/or network administrators. Furthermore, current methods do not allow for easy scheduling visibility, rescheduling changes, nor documenting change completion.

In addition, communication with engineers making changes, market managers, and network administrators is reactionary and is often limited to daily change calls with market managers and/or network administrators. There is a generalized lack of communication between those submitting a change request and the technical teams sourced with making the changes to the network.

What is needed is a holistic change management application with control capabilities for the geographically disperse mobile network. The change management application is real-time and can implement freezes, provide change risk assessments and track completed changes, current executing changes, outages, and schedules quickly for linkage, overlaps, and connections between these key areas of a geographically diverse mobile telecommunications network.

The change management application provides risk assessments, network actions, and risk assessment such that a change team can focus on the more complex or higher risk changes. The change management application provides context to changes as well as command and control of the change management landscape.

In addition to providing a risk assessment, change management application provides visibility to engineering, operations, and geographic market teams into changes being scheduled and executed on data centers, markets, and/or pooled nodes. Change management application also provides a portal for scheduling and coordinating between teams changes to the network. Change management applications allows teams to elevate, communicate, and scrutinize such changes to the network more thoroughly compared to current methods. Change managefreeze out other changes due to this one high risk change if necessary as covered in other sections.

Change management application helps delay or reschedule high risk or impacting changes that cause an outage. It also improves customer services by delaying or rescheduling changes that may cause an outage. Change management application allows change requests to be rescheduled to a more appropriate time and identifies inefficient change windows and changes that are in direct conflict with one another.

Change management application reduces inefficient scheduling by identifying when a window for change is going unused. For example, a change may be cancelled or rescheduled. This provides a window for a different change to be scheduled. Change management application provides notifications to change teams and geographic market teams to understand the changes being made and potential impact on the network. Change management application also includes a historical tracking feature to determine what change or changes relate to an outage in a geographic area.

Change management application assists technology leaders, change deployment owners, incident managers, and change owners. For example, a technology leader may want to know changes scheduled to occur in a specified time window. A change management application dashboard utilizes a map to determine changes at the market and national level. Heat map type logic provides "scale" of changes in a particular location/market. Drill-down capability allows a more detailed view of the changes (deployments) with a filter to narrow time-range. Exemplary change management services include Simplified Change and Configuration Management Database (CMDB)/Service.

The change management application provides change deployment owners with real-time visibility to the changes that are scheduled to be deployed by a team in the upcoming period, with a view on those that are "deployment ready" and those still in the pre-deployment parts of the change process; Request for Comments (RFC); Waiting For Approval; waiting for Change Advisory Board (CAB); and those that have already been implemented. Changes can be filtered by risk and impact or by specific centralized location (CL) Class, change teams, and by specific time ranges.

Change management application provides a schedule and plans the deployments for the upcoming period, both assigning work to relevant team members and providing updates on the progress into the change management application. Change management application provides a real-time high level/drill down view of all changes that have been scheduled for deployment or implemented in the last time period (30 minutes, 2 hours, etc.). These changes can be filtered based on CL Class, time, team, and impacted services. The change management application provides real-time visibility of changes in process and implementation schedule. Change management application provides a calendar of upcoming change volume, major deployments, restrictions, freezes, and releases that can be filtered by Cl Class, Market/Location, and date range. Change management application also serves as a central point for communicating change status, immediate updates to status (e.g. new freeze, hold all changes, major incident underway, etc.), and initiating actions on the geographical diverse mobile telecommunications network. Change management application communicates with all deployment teams/changes teams that have immediately scheduled changes such that holds or amendments can be made to change processes.

The change management application manages the change request data 24 hours a day, seven days a week. The change request typically includes a record of changes to be performed on the network. Some changes to the network are regulated by Sarbanes-Oxley. A geographically diverse mobile telecommunications network has hundreds of locations and cell towers. Each of these hundreds of data centers have computer servers and equipment to which changes need to be made. An exemplary geographically diverse mobile telecommunications network described with respect to FIG. 1.

With reference to FIG. 1, an example is depicted illustrating aspects described herein implemented in a communication network 100. Generally, communication network 100 comprises base station(s) 102, database(s) 110, and user device 112. It will be understood by those skilled in the art that a communication network, such as communication network 100, may include an array of devices or components, some of which are not shown so as to not obscure more relevant aspects of the invention. Components such as terminals, links, and nodes (as well as other components) may provide connectivity in some embodiments. In aspects, network 100 is associated with one or more communications provider that provides services to user devices, such as user device 112. For example, network 100 may provide voice and/or data services to user devices or corresponding users that are registered or subscribed to utilize the services provided by a communications provider. Network 100 can be any communication network providing voice and/or data service(s), such as, for example, a 1× circuit voice; a 3G network (e.g., CDMA, CDMA2000, WCDMA, GSM, UMTS); a 4G network (WiMAX, LTE, HSDPA); a 5G network; a 6G network; or the like.

Database 110 may be any type of medium capable of storing information. In some aspects, database 110 comprises at least one instance of a database that is part of a distributed database, such as database 110.

In aspects, base station 102 is a wireless communications station installed at a fixed location, such as a communication tower, as illustrated in FIG. 1. The communication tower may be a structure designed to support one or more antennas for communications and/or broadcasting. In other embodiments, base station 102 is a mobile base station, small cell, mini cell, micro cell, pico cell, and/or a femto cell. The base station 102 may be an eNode B in an LTE telecommunications network and may be used to communicate as part of the wireless communications network. In this way, base station 102 can facilitate wireless communications between user device 112 and other devices, user devices, the Internet, and/or network 100. The base station 102 may include at least one baseband unit (BBU) responsible for, among other things, digital baseband signal processing. For instance, CDMA/EVDO and LTE Internet protocol (IP) packets are received from a wireless communications network and are digitally combined by the BBU at the base station 102. The blended digital baseband signal is transmitted to a radio at the base station 102. Digital baseband signals received from the radio are demodulated by the BBU and the resulting IP packets are transmitted by the BBU to the network. The base station 102 may include a radio (not shown) or a remote radio head (RRH) that generally communicates with one or more antennas associated with the base station 102. The base station may support multiple-input-multiple-output (MIMO) and/or time division duplex or any other suitable communication protocols. In some aspects, base station includes a database 110. In some aspects, base station 102 includes a base station clock (device clock) that facilitates time division duplex, MIMO, and/or other communication protocols supported by base station 102 between the base station and one or more user devices, such as user device 112.

User device 112 can communicate with other devices, such as mobile devices, servers, etc. The user device 112 can take on a variety of forms, such as a personal computer; a laptop computer; a tablet; a netbook; a mobile phone; a smart phone; a personal digital assistant; or any other device capable of communicating with other devices by way of a network. Makers of illustrated user devices include, for example, Research in Motion; Creative Technologies Corp.; Samsung; Apple computers; Nokia, Motorola; and the like. A user device 112 may comprise, for example, a display(s); a power source(s) (e.g., a battery); a data store(s); a speaker (s), memory; a buffer(s); and the like. In embodiments, user device 112 comprises a wireless or mobile device with which a wireless telecommunications network(s) can be utilized for communication, e.g., voice and/or data communication. In this regard, the user device 112 can be any mobile computing device that communicates by way of, for example, a 3G, 4G, or 5G network. User device 112 may connect, at least temporarily, to base station 102.

Figure 2:
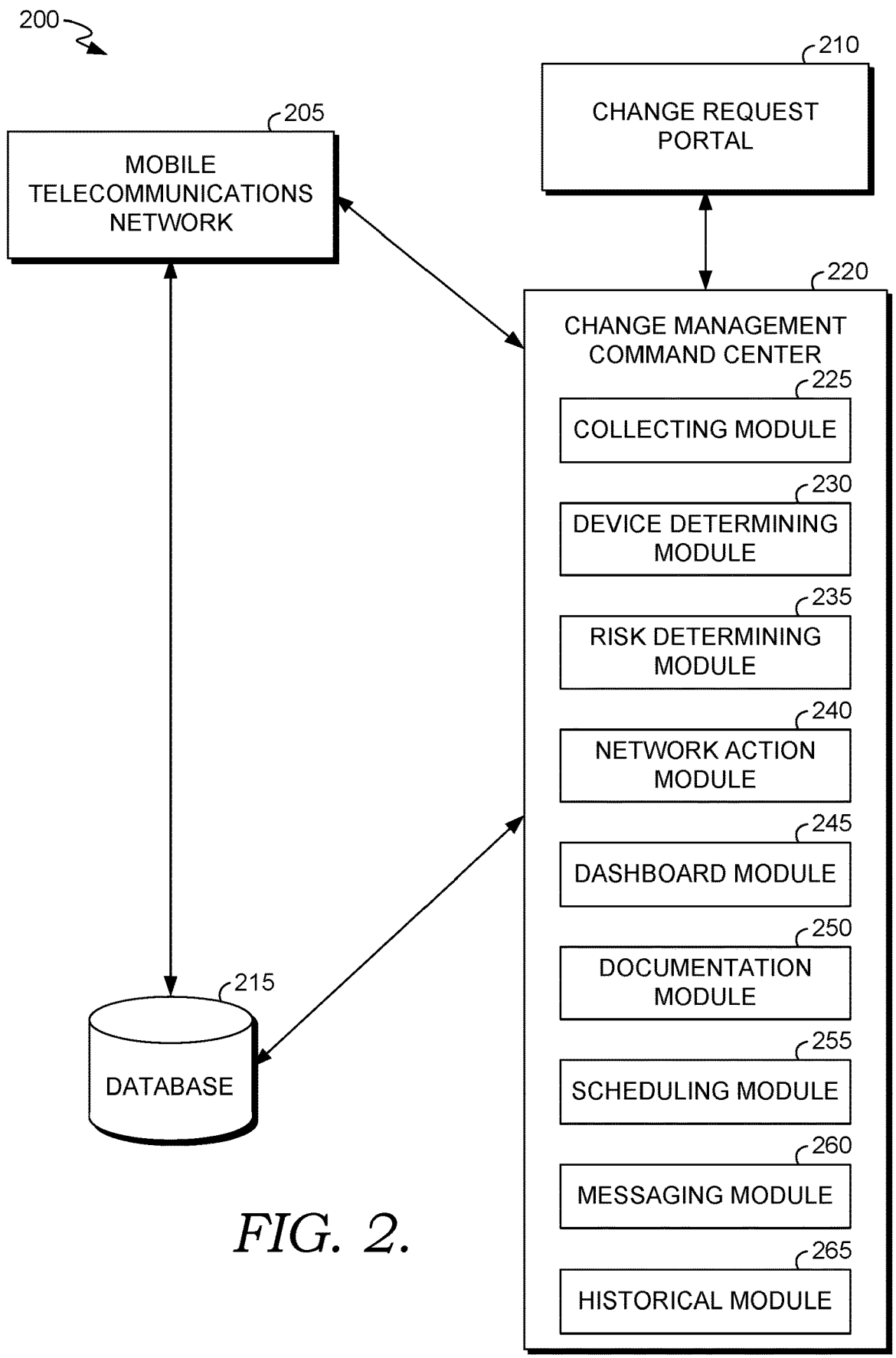
FIG. 2 depicts a computer system suitable for use in implementing aspects herein.

Turning to FIG. 2, an exemplary computing system 200 is depicted. The computing system 200 (hereinafter "system") is merely an example of one suitable computing system and is not intended to suggest any limitation as to the scope of use or functionality of embodiments of the present invention. Neither should the system 200 be interpreted as having any dependency or requirement related to any single module or combination of modules illustrated herein.

In some embodiments, one or more of the illustrated modules may be implemented as a stand-alone application. The modules described are exemplary in nature and in number and should not be construed as limiting. Any number of components may be employed to achieve the desired functionality within the scope of the embodiments hereof. Further, modules may be located on any number of servers.

In the embodiment shown in FIG. 2, the system 200 includes a network 205 and change request portal 210, database 215, and change management application 220. Network 205 is the geographically diverse mobile telecommunications network discuss with respect to FIG. 1. Change request portal 210 is utilized users requesting that changes be implemented to components of the network 205. The change request portal 210 provides a change request form and questions for the user to provide inputs regarding the change to the network request.

Generally, the change management application 220 is configured to query change requests, determine network devices impacted by the change request to determine risks of change request, and initiate appropriate network actions in response to the change request risks to the network. In this embodiment, the change management application 220 is comprised of machine readable instructions (not shown); collecting module 225; device determining module 230; risk determining module 235; network action module 240; dashboard module 245; documentation module 250; scheduling module 255; messaging module 260; and historical module 265. It will be appreciated that any variety of programming languages can be used for change management application 220. Change management application 220 may be comprised of more or fewer modules and any and all variations are contemplated herein. The modules described are exemplary in nature and in number and should not be construed as limited. Any number of modules may be employed to achieve the desired functionality within the scope of the embodiments hereof.

Additionally, in some aspects, the change management application 220 may also be located within the database 215. It is also contemplated that management command center 220 may be integrated with the change request portal 210.

The collecting module 225 within the change management application 220 is configured to collect and receive change request data from the change request portal 210. The change request portal 210 receives input from a user, including identification of the date of change request; issue; identification of the hardware or software to be changed; location; a deadline; the type of change; and a textual abstract with information regarding the change to be made. Typical change requests include: identifying bugs that are to be fixed in hardware devices or software running on devices; system enhancements; system developments; changes in underlying structure; and/or standards and demands from management or customers.

Change requests for input into the collecting module ask a series of questions based on type of equipment for which changes are being made and type of work requested to be performed. A user submitting a change request may be asked what type of change is being requested and type of device. Depending on the change and device type or type of change, a different set of questions is asked of the user. For example, changes being made to a core Cisco router in the heart of Houston may ask more questions for the change request than a computer located outside of a major market.

Additional information in the change request for the present embodiments may include asking users: Have you done this type of change before? Has this been tested in lab? What were the lab test results? Does it impact 911?

Next, the device determining module 230 compares the information received by collecting module 225 with mapping from the database 215 to determine the devices impacted by the change request. Database 215 includes a digital mapping of the network and components based on physical geographic location and digital connections between devices. The mapping identifies the geographic location of devices and servers along with the market(s) served by the devices. The mapping identifies whether a device is part of pooled nodes and may impact several geographic locations or markets.

Device determining module 230 utilizes the information from the collecting module 225, such as comparing device identification to information from database 215, to determine the geographic location and market where changes are being implemented for a change request. For example, location may be a specific tower or data center and market may be a broader coverage area, such as the Houston or Orlando market. In addition, device determining module 230 can determine whether a change request impacts pooled nodes. Pooled nodes are devices and/or servers that may service more than one location or market. For example, Houston and Orlando may be served by pooled nodes and/or servers physically located in Chicago.

Risk determining module 235 determines the risk of the change request. Risk determining module 235 accesses database 215 to identify predefined criteria such as the time and location of network impacting events, such as major events (e.g. sporting events, concerts, meetings, political events, etc.) as well as weather events, major disasters, and other situations that may have a significant impact on the mobile network by causing high usage or outage. Risk determining module 235 compares the location of network impacting events to the geographic location of the devices and/or servers for the change request as identified by device determining module 230 to determine whether proposed changes are risk. For example, if the devices to be changed for a change request are located in a city about to experience a network impacting hurricane event, the changes are determined to be high risk. In one embodiment, change risks are categorized into normal, medium, and high risk. These are depicted by dashboard module 245 respectively as green, yellow, and red inner circles on the map. For example, of twenty change requests, one may be categorized as high risk and nineteen categorized as normal. For changes determined to be high risk, a network action to freeze changes can be initiated by network action module 240.

Depending on the calculated risk (e.g. normal, medium, or high) any variety of actions, including freezing or suspending the change from being made in a location or to a device; rescheduling the requested change to a lower risk time; issuing a warning or caution alert for change(s); requesting additional information for change request; requesting additional testing for change request; requesting supervisory review of change request; and assigning the change to a specialized engineer or team. In addition, network actions may be initiated manually from the dashboard module 245, if a user is authorized and notices conditions that necessitate a network action.

Figure 4:
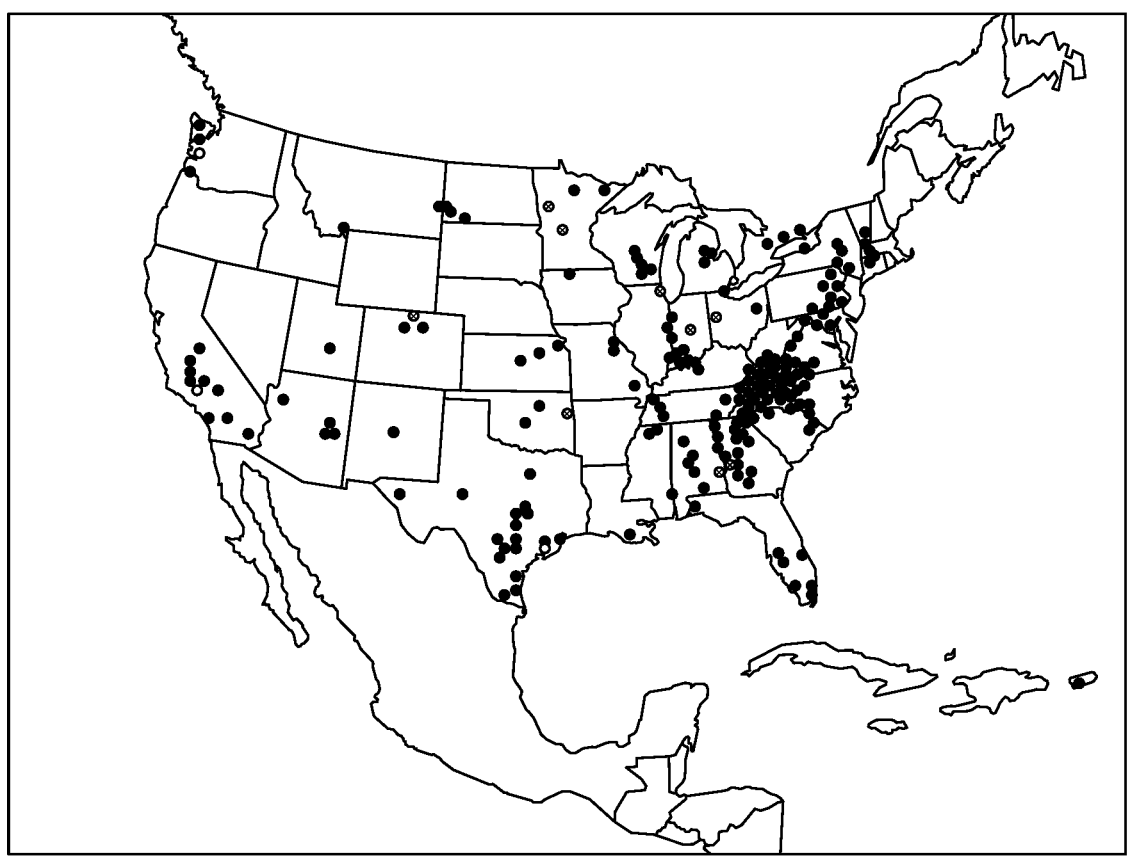
FIG. 4 depicts exemplary changes to be made to a geographically disperse global communications network, according to an aspect herein.

Dashboard module 245 displays changes being made throughout the geographically diverse telecommunications network as shown in FIG. 4. For example, FIG. 4 depicts 75 dots across the United States to show where changes are presently being made to the geographically diverse mobile communications network. FIG. 4 may also include a DEFCON level from 1-5 for the change status of the overall network. For example, DEFCON 1 means that many high-risk changes are being made. Whereas, DEFCON 5 means not many changes are currently being made.

The calculated risk and any associated network actions can be displayed on dashboard module 245. Dashboard module 245 provides an interactive graphical user interface that provides a comprehensive and interactive view to understand the change landscape of a geographically diverse mobile telecommunications network. Dashboard module 245 utilizes the information calculated and determined by risk determining module 235, scheduling module 255, and historical module 265 to build a visual of current, future, and historical changes on the geographically diverse mobile telecommunications network. Dashboard module 245 provides a quick and comprehensive view into the change landscape of the geographically diverse mobile telecommunications network by geographical location and time progression.

Figure 5:
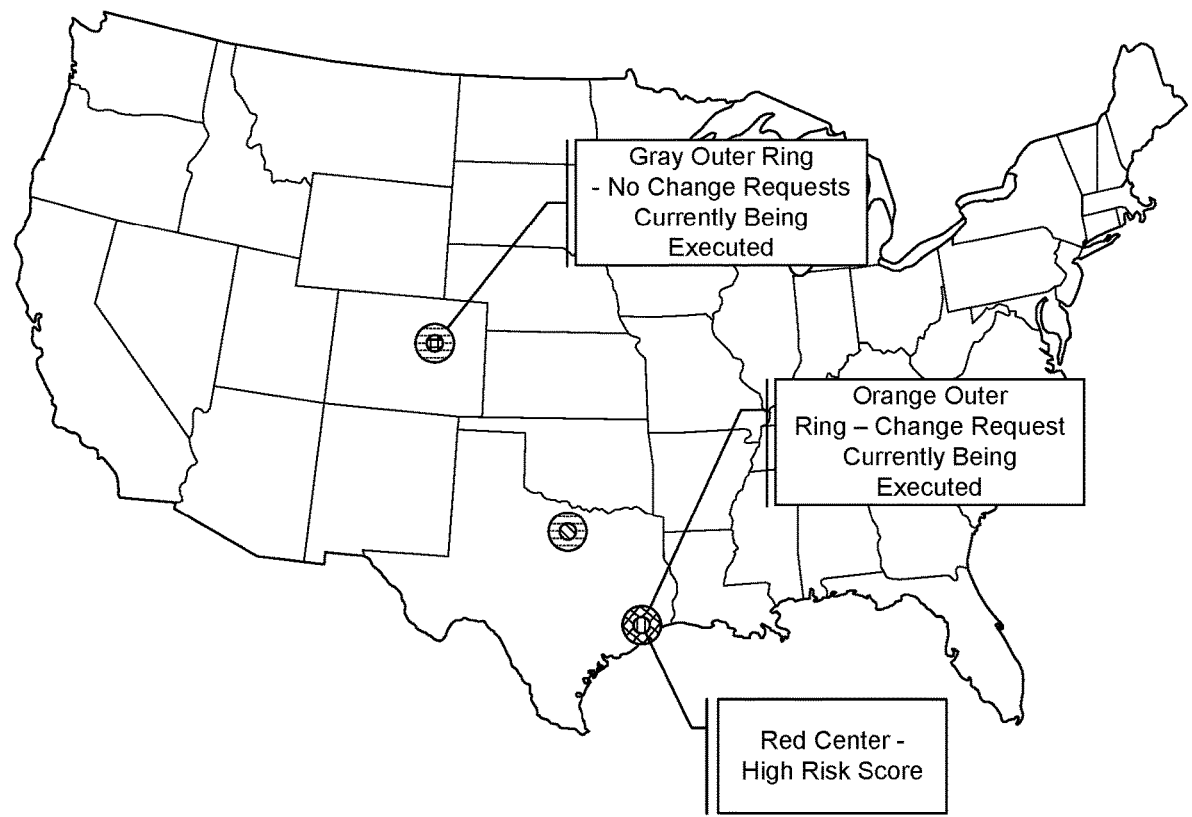
FIG. 5 depicts planned changes, changes currently being executed and high-risk changes in a geographically disperse global communications network, according to an aspect herein.

The calculated risk and network actions generated for the dashboard can be shown based on date and time. FIG. 5 further delineates the changes to the network based on calculated and network actions. For example, the DEFCON level and/or calculated risk along with changes currently being executed can be displayed on dashboard module 245 and can be color coded with a legend provided as shown in FIG. 5. FIG. 5 depicts that high-risk changes are currently being executed in the Houston market and changes are not currently being made in the Denver market. FIG. 5 depicts where extra care and scrutiny need to be utilized when making changes based on the calculated risk. The outer circles in FIG. 5 represent whether any changes are currently being executed and the inside circles indicate calculated risk. As shown, a gray ring indicates no changes are currently being executed and an orange ring indicates changes are currently being executed. It will be appreciated that any type of indicators may be utilized to represent changes and calculated risk.

Figure 6:
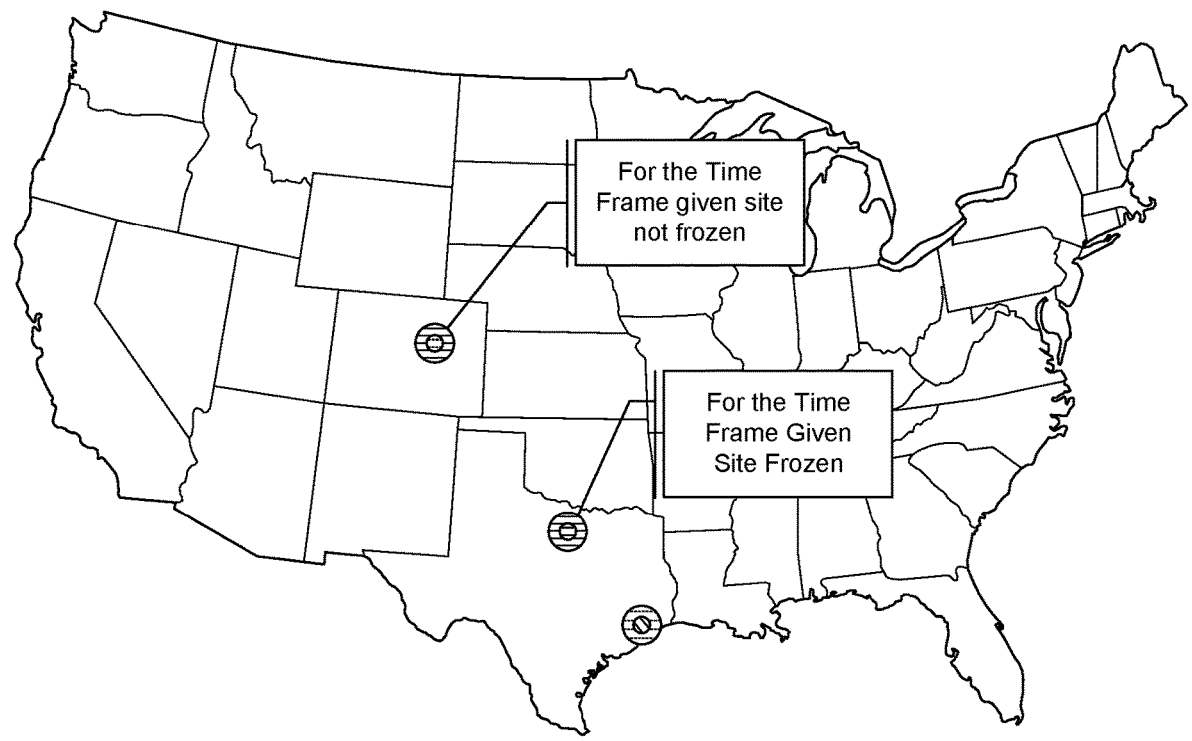
FIG. 6 depicts actions initiated for high-risk changes to a geographically disperse global communications network, according to an aspect herein.

Dashboard module 245 also displays network actions being taken based on the calculated risk. For example, if a freeze has been implemented because a change request has been determined to be high risk, this is depicted on dashboard module 245 as shown in FIG. 6. For example, in FIG. 6, it shows that currently the Dallas market is frozen for making changes during a particular time frame, whereas the Denver market is not. In addition, network actions such as alerts and requests for additional information may also be depicted by dashboard module 245.

Dashboard module 245 is interactive and be filtered to see specific changes based on markets, locations, class of systems, 911 changes and/or services. Dashboard module 245 provides the ability to see down to the device change level and provides a link to the change request information at the device level to see commands currently being executed against a device under a certain change request. Dashboard module 245 can be filtered to provide present, historical and future views of changes as well as changes scheduled and associated network actions for a given time frame. Dashboard module 245 can be filtered to show completed change requests.

Dashboard module 245 can depict a layered view showing current outages overlaying locations of changes being made, scheduled or historical changes by historical module 265.

Documentation module 250, scheduling module 255 and messaging module 260 can be accessed directly from dashboard module 245.

Documentation module 250 provides a starting and stopping place for network technicians to document changes being made to the network. Documentation module 250 allows a technician to input information and receive information. A technician logs in to the CCC through dashboard module 245 to start and stop making changes. A technician can select a change request for documentation. From documentation module 250 utilizing dashboard module 245, a technician can view other changes scheduled for the same location/market as the change request and is able to drill down within the dashboard to see attributes for this and other changes including location, risk, device type schedule, pool configuration, freezes, outages and weather.

In one embodiment, when a technician begins implementing changes for a change request, any network actions based on calculated risk are provided to the technician. These network actions and other information include stop work notifications, change freezes (no changes to be made) to the devices in the change request, outages in the network that may be impacted by the changes, and conflicts that may arise if making the change.

A technician inputs information regarding type of change made, device changed, and time and date of change. Once the technician has documented completion of a change request, the pending change request on dashboard module 245 may change color to indicate a change has been completed. In addition to documenting changes made pursuant to change requests, a technician may also document geographically diverse mobile communication network changes made spontaneously or in response to a change made pursuant to a change request. For example, when completing a change for a change request, a technician may determine additional change(s) need to be made to keep the network healthy and functional. The technician can document these changes through documentation module 250.

Messaging module 260 provides for communication between users of the change command center 220. Messaging module 260 may be any type of user communication application, such as text messaging, instant message, and e-mail. Messaging module 260 allows for direct communication between customers, requestors, testers, technicians and teams. Direction communication between users and announcements broadcast to some or all users may be performed by messaging module 260.

Using messaging module 260, a technician can notify other users and technicians that he/she is getting ready to start a change. Technicians can communicate to other users and technicians if another change request has impacted their work or if the technician discovers a conflict.

Messages can be broadcast to some or all users using messaging module 260. For example, if changes are determined to be high risk, a network action initiates a message to be broadcast to all applicable users to "stop all work." In addition to a freeze or stop work announcement, messages regarding safety and caution alerts as well as education can be communicated using messaging module 260. For example, a message may be sent to technicians in a particular market that it is a high retail period and to use caution when making changes.

Scheduling module 255 is accessible from dashboard module 245 and displays scheduled change requests and is dynamic so change requests can be changed. To facilitate workforce planning, scheduling module 255 communicates with dashboard module 245 to display all change requests currently being made in real time by location. Scheduling module 245 can also be utilized to make changes to the schedule, including future changes requests to be made to the network and associated risk. Changes can be moved to future time slots. Scheduling module 255 shows any conflicts with scheduled change requests in a particular location such that changes can be moved to future time slots. Scheduling module 255 is in communication with documentation module 250 such that in one embodiment, a new change request in to the same device or in the same location cannot be started until the previous change request on the schedule has been made and documented or moved to another time slot for completion. Scheduling module 255 provides an overall view of incoming work, amount and locations. Scheduling module 255 allows for prioritization of urgent activities and the ability to move scheduled changes based on calculated risk, conflicts, and workloads. Scheduling module 255 provides scheduling calendars based on teams, technicians, locations, and markets. Scheduling module 255 can filter the schedule based on time, market, location, and risks. Scheduling module 255 provides a schedule based on maintenance window constraints.

Historical module 265 provides historical tracking of change requests, outages, conflicts, and failures. Historical module 265 calculates the days since last change outage or change conflict. Historical module 265 indicates any failures occurring the previous night and identifies change requests associated with current outages. Historical module 265 provides an overall view of accuracy of changes made on the network. For example, was the change listed in the change request the change needed or did it require a technician to perform a change "fix on the fly." Using historical information, analytics can be run and patterns identified.

Figure 3:
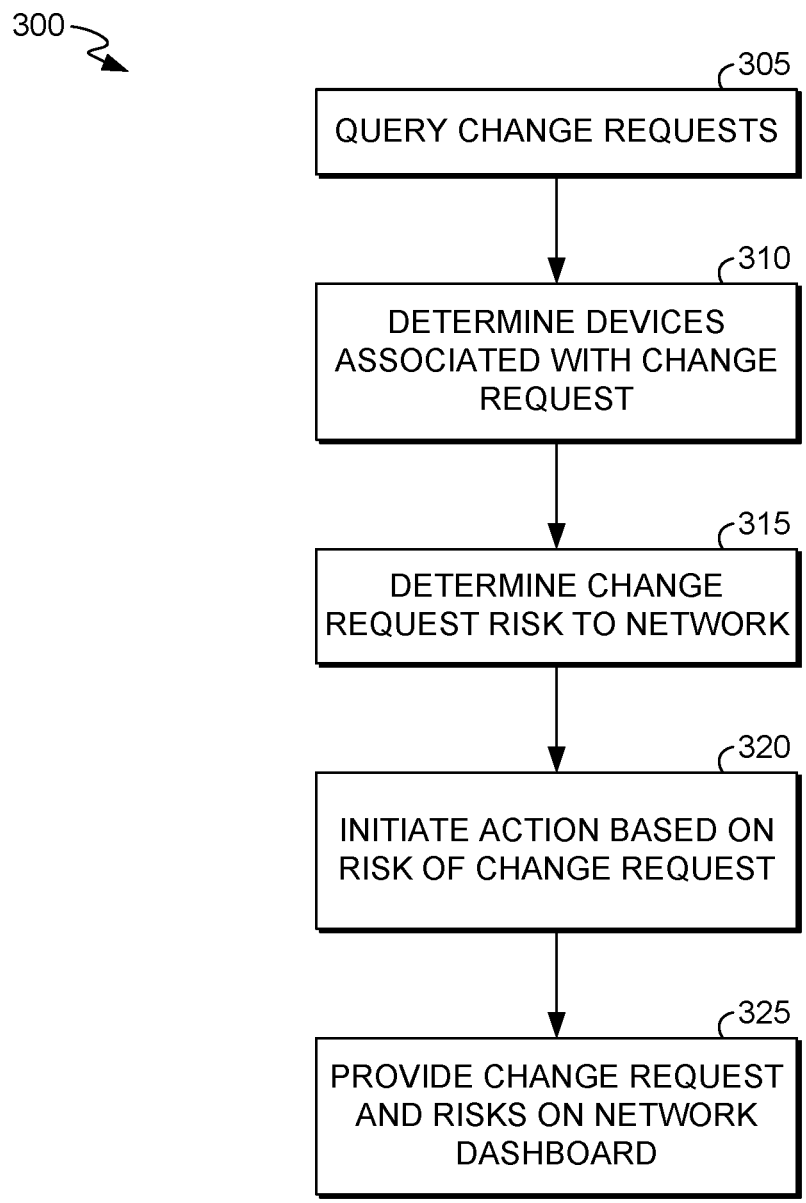
FIG. 3 depicts an exemplary method for suspending high-risk changes to a geographically disperse mobile telecommunications network.

Turning now to FIG. 3, a method 300 for determining risk of changes to a mobile communications network is provided. At 305, the computer system of FIG. 2 queries change requests from change request portal. For example, the system obtains change requests that have been submitted and are to be made to the system. At step 310, the system determines what devices in the mobile telecommunications network are associated with a change request. In one embodiment, the system accesses a map of the network that includes the devices throughout the network. The change request is compared to the mapping to determine the device(s) associated with the change request. At 315, the system determines the risk that is associated with making the change per the change request. For example, the system determines that the device is located in a location or market that may be impacted by a network impacting event and thus identifies the change request as high risk. The system compares the identified device with information obtained from the database about high impact network impacting events to determine whether the device with the change request may be impacted by weather, major event, etc. At 320, the system initiates an action on the network in response to the change request. The action may include freeze, warning, etc. At 325, the system provides the change requested and calculated risk via a dashboard.

Figure 7:
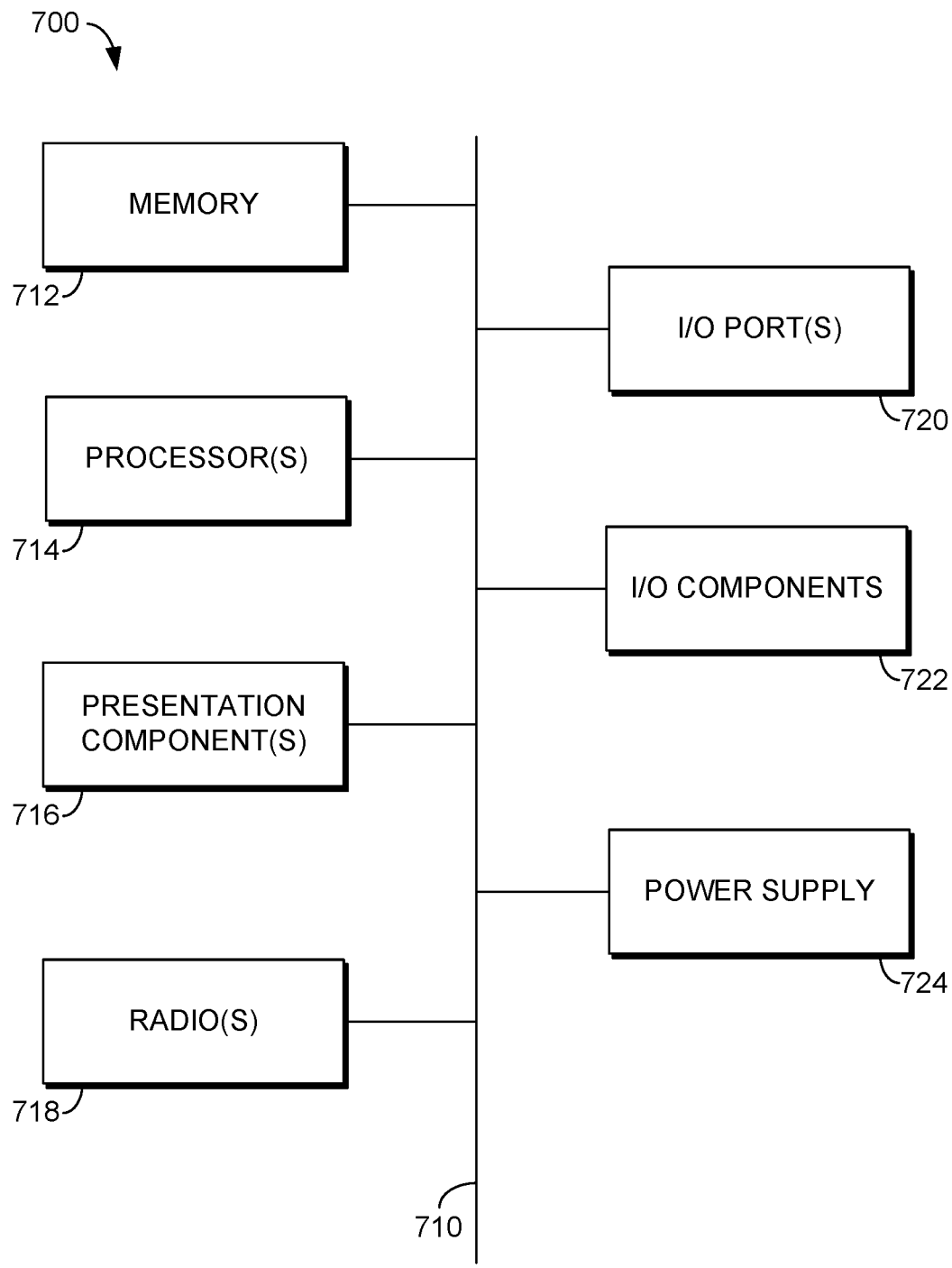
FIG. 7 depicts an exemplary computing device suitable for use in implementing aspects herein.

In FIG. 7, computing device 710 can directly or indirectly couple to the following devices: memory 712; one or more processors 714; one or more presentation components 716; input/output ports 720; input/output components 722; illustrative power supply 724; and one or more radio sources or aspects 718. The various blocks of FIG. 7 are shown with lines for the sake of conceptual clarity, and other arrangements of the described components and/or component functionality are contemplated. For example, processors have memory. The diagram of FIG. 7 is merely illustrative of an example computing device that can be used in connection with one or more embodiments of the present invention.

Computing device 710 typically includes a variety of computer-readable media. Computer-readable media can be any available media that can be accessed by computing device 710 and includes both volatile and nonvolatile, removable and non-removable media. By way of example, and not limitation, computer-readable media may comprise computer storage media and communication media. Computer storage media excludes signals, per se. Computer storage media include volatile and nonvolatile, removable and non-removable media implemented in any method or technology for storage of information, such as computer-readable instructions, data structures, program modules, or other data. Computer storage media includes, but is not limited to, RAM; ROM; EEPROM; flash memory or other memory technology; CD-ROM; digital versatile disks (DVD); or other optical disk storage, magnetic cassettes, magnetic tape, magnetic disk storage or other magnetic storage devices, or any other medium which can be used to store the desired information and which can be accessed by computing device 610.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 710 includes one or more processors that read data from various entities, such as memory 712 or I/O components 722. Presentation component(s) 716 present data indications to a user or other device. Exemplary presentation components include a display device, speaker, printing component, vibrating component, etc. I/O ports 720 allow computing device 710 to be logically coupled to other devices, including I/O components 722, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low level software written in machine code; higher level software, such as application software; and any combination thereof. In this regard, the system components can manage resources and provide services for system functionality. Any other variations and combinations thereof are contemplated with embodiments of the present invention.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer system comprising:
one or more processors; and
one or more non-transitory computer readable media storing computer executable instructions that when executed by the one or more processors perform a method including:
receiving one or more change requests for changes to be implemented on a set of pooled network nodes of a mobile telecommunications network during a change request time, the set of pooled network nodes providing wireless telecommunication service to a geographic area;
identifying a network impacting event affecting the geographic area during the change request time, the network impacting event comprising one or more of a major event, a major disaster, or a weather event;
determining that a group of devices are located in the geographic area;
prior to implementing the one or more change requests, using a risk determining module to determine a risk that implementation of the one or more change requests during the change request time will create an outage on the set of pooled network nodes for the group of devices; and
responsive to determining the one or more change requests for the group of devices will be affected by a network impacting event, preventing the implementation of the one or more change requests on the set of pooled nodes.

2. The system of claim 1, wherein preventing the implementation of the one or more change requests on the set of pooled nodes devices includes one or more of rescheduling the requested change to a time associated with a lower risk than the risk, issuing a warning, requesting additional information for the change request, requesting additional testing for the change request, requesting supervisory review of the change request, and assigning the change to a specialized team for completion.

3. The system of claim 1, wherein a criteria for the network impacting event is accessed from a database.

4. One or more non-transitory computer storage media having computer-executable instructions embodied thereon that, when executed, perform a method for:
receiving one or more change requests for changes to be implemented on a set of pooled nodes of a mobile telecommunications network during a change request time, the set of pooled network nodes providing wireless communication service to a geographic area;
identifying a network impacting event affecting the geographic area during the change request time, the network impacting event comprising one or more of a major event, a major disaster, or a weather event;

determining that a group of devices are located in the geographic area;

prior to implementing the one or more change requests, using a risk determining module to determine a risk that implementation of the one or more change requests during the change request time will create an outage on the set of pooled network nodes for the group of devices; and responsive to determining the one or more change requests for the group of devices will be affected by the network impacting event, preventing the implementation of the one or more change requests on the set of pooled network nodes.

5. The non-transitory computer storage media of claim 4, wherein preventing the implementation of the one or more change requests on the set of pooled nodes includes one or more of rescheduling the requested change to a time associated with a lower risk than the risk, issuing a warning, requesting additional information for the change request, requesting additional testing for the change request, requesting supervisory review of the change request, and assigning the change to a specialized team for completion.

6. The non-transitory computer storage media of claim 4, wherein a criteria for the network impacting event is accessed from a database.

7. A method for predicting consequences of change requests to be implemented in a mobile telecommunications network, the method comprising:

receiving one or more change requests for changes to be implemented on a set of pooled network nodes of a mobile telecommunications network during a change request time, the set of pooled network nodes providing wireless telecommunication service to a geographic area;

identifying a network impacting event affecting the geographic area during the change request time, the network impacting event comprising one or more of a major event, a major disaster, or a weather event;

determining that a group of devices are located in the geographic area;

prior to implementing the one or more change requests, using a risk determining module to determine a risk that implementation of the one or more change requests during the change request time will create an outage on the set of pooled network nodes for the group of devices; and responsive to determining the one or more change requests for the group of devices will be affected by the network impacting event, preventing the implementation of the one or more change requests on the set of pooled network nodes.

8. The method of claim 7, wherein preventing the implementation of the one or more change requests on the set of pooled nodes includes one or more of rescheduling the requested change to a time associated with a lower risk than the risk, issuing a warning, requesting additional information for the change request, requesting additional testing for the change request, requesting supervisory review of the change request, and assigning the change to a specialized team for completion.

9. The method of claim 7, wherein a criteria for the network impacting event is accessed from a database.

10. The method of claim 7, further comprising comparing data from a device determining module comprising mapping from a database to identify whether the group of devices is in the set of pooled nodes.

* * * * *